June 9, 1953           F. M. CROSSMAN           2,641,313

FLUID FUEL-FIRED HEAT RADIATION GENERATOR

Filed Aug. 4, 1949

INVENTOR.
Francis M. Crossmann
BY
Fraser, Myers & Manley,
ATTORNEYS.

Patented June 9, 1953

2,641,313

UNITED STATES PATENT OFFICE 2,641,313

FLUID FUEL-FIRED HEAT RADIATION GENERATOR

Francis M. Crossman, New York, N. Y.

Application August 4, 1949, Serial No. 108,486

4 Claims. (Cl. 158—113)

My present invention relates to a fuel-fired infra-red radiation generator and aims to provide certain improvements therein.

Fuel-fired, and particularly gas-fired infrared radiation generators, have been extensively used for drying painted articles, web material, fabrics after dyeing, and for curing various synthetic resinous compositions. Fundamentally such generators consist of a casing in which natural or manufactured combustible gas or fuel oil is burned and the resulting flame made to impinge upon the surface of a refractory material, which becomes incandescent and generates the infra-red radiations or electromagnetic waves which are propagated to the material to be dried or cured. Such generators also produce a great amount of heat of combustion, sparks of incandescent carbon, and products of the incomplete combustion of the gas, notably, carbon monoxide, all of which, to varying degrees, are deleterious to the drying and curing operations above referred to. The high temperature produced by the heat of combustion at times is sufficient to scorch the material being dried and, where resinous compositions containing solvents having a relatively low flash point are being cured, there is ever present the danger of igniting such solvent. The sparks of ignited carbon upon striking the material being dried or heat-treated cause scorching or spotting of the materials especially if said materials are of light or pastel colors. The products of incomplete combustion of the gas, and notably carbon monoxide, give rise to what is known as "gas fading" in dyed fabrics due to the fact that the dyes are not completely fixed or set prior to thorough drying. Also, certain resinous compounds, for example, polyvinyl chloride, react with carbon monoxide which imparts brittleness to the resin.

Among the objects of the present invention are (1) to provide a gas-fired infra-red radiation generator which will overcome the above enumerated objections to such generators heretofore used; (2) to provide a gas-fired infra-red radiation generator which will assure complete combustion of the gas and thus eliminate the formation of carbon monoxide and its concomitant deleterious effects; (3) to provide a device of the character set forth whereby drying and/or curing of materials is accomplished solely by infrared radiations; (4) to provide a device of the character set forth in which the products of combustion are prevented from reaching the material being acted upon; and (5) to provide a gas-fired infra-red radiation generator of simple construction, high efficiency and foolproof operation.

The foregoing and other objects of my invention not specifically enumerated I attain by providing a gas-fired, infra-red radiation generator which is preferably closed on all sides by a fine mesh screen formed of nickel or a nickel alloy, which serves to prevent the flame from passing therethrough, and also as a catalyst which assures complete combustion of the gas; and by providing an auxiliary air blast over and across the burning fuel which assures the complete combustion thereof and the diverting of the heat of combustion and the products of combustion away from the material being treated, without interfering in any way with the propagation of the infra-red radiations from the incandescent ceramic of the generator to said material being treated. The invention will be more fully comprehended from the detailed description which follows when considered in connection with the accompanying drawings, wherein:

Figure 1:
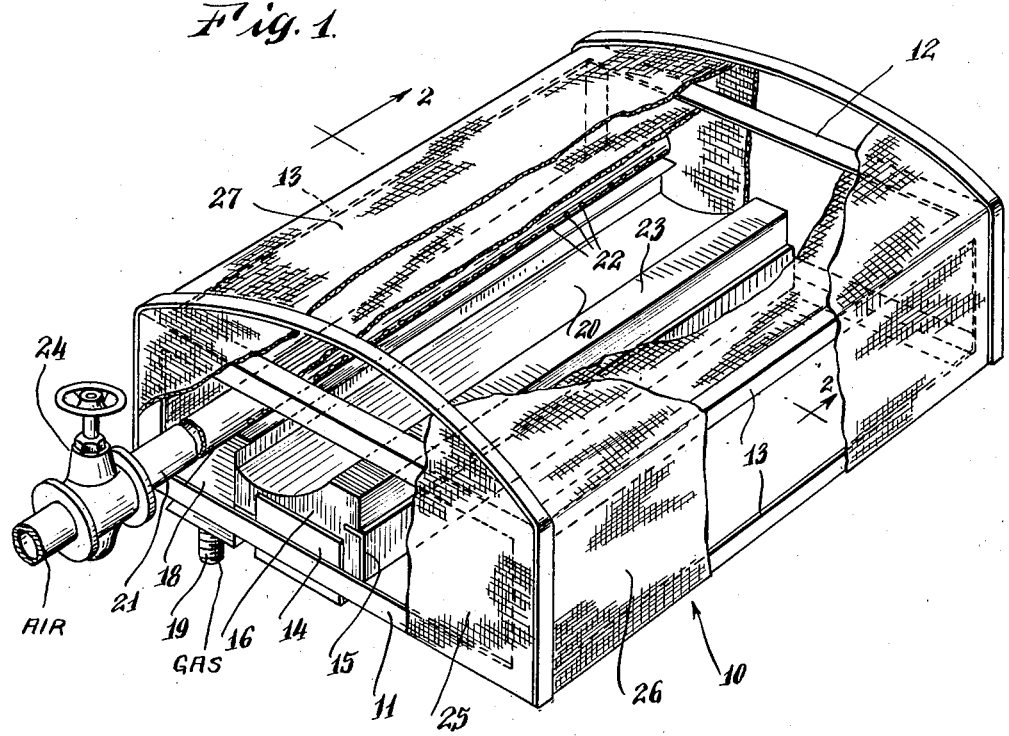
Figure 1 is an isometric view of an infra-red generator embodying my invention.
Figure 2:
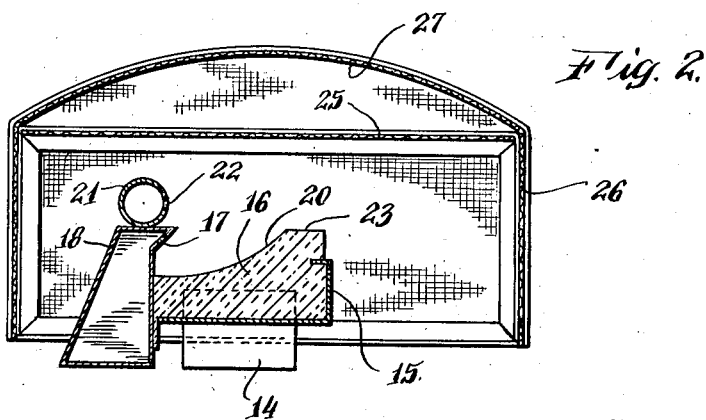
Fig. 2 is a transverse sectional view taken along the plane of the line 2—2 of Fig. 1.

The infra-red radiation generator illustrated in the drawings consists of a substantially parallelepipedon casing 10, herein shown as rectangular, having a skeleton frame formed by the rectangular end members 11 and 12 and side connecting members 13, which end members and side members may be made from angle iron sections of equivalent means. Supported within the casing and preferably between the end members 11 and 12 by plates 14 and 15 is a hearth 16 formed of a material adapted to generate infrared radiations when subjected to intense heat, said hearth being preferably formed of refractory ceramic material. For heating the hearth to incandescence, any suitable liquid or gaseous fuel may be employed and burned upon issuing from orifices 17 in a suitable burner 18 of any desired type, wherein the fuel and air are suitably mixed to form a highly combustible mixture.

The fuel, preferably gas, may be supplied to the burner 18 through a pipe 19.

The hearth 16 is preferably formed with a curved flame-impinging surface 20 and the burner 18 has its orifices 17 so disposed that when the combustible mixture of fuel and air is burned, the flame will be directed downwardly onto the hearth so that the tip of the flame will extend upwardly over the curved surface of the hearth.

To assure complete combustion of the fuel and prevent the formation of carbon monoxide during such burner, means are provided for blowing a supplemental current of air above and across the hearth, said supplemental current of air being provided from a source of air under pressure through a pipe 21 disposed above the burner 18, said pipe having therein orifices 22 so disposed as to blow said air over the top surface 23 of the hearth. A valve 24 operable either manually or automatically may be employed for controlling the amount of such air.

During the burning of the fuel, especially if incomplete combustion takes place, sparks of incandescent carbon may be given off, and, to prevent such sparks from reaching the material being treated by the generator, I form the exposed walls of the generator of wire mesh screen 25. Such screening also serves the additional function of preventing any flames within the casing from passing therethrough. I also prefer to use wire mesh screen formed of nickel or a nickel alloy, as such nickel-containing screen will act as a catalyst to further assure the complete combustion of the fuel within the casing. The current of air issuing from the pipe 21 and blowing over and across the hearth 16 also operates to divert the normally upwardly burning flame and the heat of combustion resulting therefrom laterally over the hearth. Said air blast also functions to blow the gaseous products of combustion out through the screened side wall 26 of the casing thus preventing such products of combustion from reaching the material being acted upon by the generated and propagated infra-red radiations. If desired, such products of combustion, which are at a relatively high temperature, may be collected and employed for preheating the fuel, for supplementary drying and curing of material being treated or for other purposes.

The wire mesh screen 25 may be secured to the skeleton frame in any desired manner and to further guard against any sparks or flame passing upwardly through the wall of the generator through which the infra-red radiations are propagated, I also prefer to provide said wall with a second wire mesh screen 27 which is spaced from and arched over the screen covering the flat top wall of the casing.

In use, one or more infra-red generators of the character described may be employed in end to end or spaced apart relation, and when the fuel is burned in each of said generators to raise the hearth to incandescence and air is blown through the orifices 22 over and across the hearth, infra-red radiations are generated by the hearth and propagated upwardly through the top of the casing substantially free from the heat of combustion. The material to be dried or cured by the infra-red radiations may be passed in spaced relation over the generator or generators, the number of which, the spacing of the treated material and the rate at which such treated material is passed over the generators being governed by the character and time factors necessary to produce the requisite drying or curing. In view of the fact that the material being treated is subjected to infra-red radiations substantially free from the heat of combustion, it will be appreciated that scorching of the material or flashing of the solvent employed when curing operations on resinous composition are being carried out, is definitely prevented. By the same token, in view of the fact that combustion within the casing is rendered complete by the air blast and catalytic action of the nickel-containing screens, the presence of reducing gases like carbon monoxide which has a deleterious effect upon dyed material, is eliminated, and also, in view of the screened walls of the casing, all danger of flame or sparks reaching the material being treated is obviated.

Accordingly, it will be appreciated from the foregoing detailed description and drawings that I have provided an infra-red radiation generator fulfilling all the objects of the invention as set forth in the opening statement hereof, and while I have shown and described a preferred embodiment of my device I do not wish to be limited to the details of construction disclosed, since these may be varied within the range of mechanical and engineering skill without departing from the spirit of my invention as defined in the appended claims.

What I claim is:

1. A fluid fuel-fired infra-red radiation generator for use in acting upon material moving exteriorly and relatively to said generator and wherein the material being acted upon will not be subjected to sparks and products of incomplete combustion of the fuel, said generator comprising a casing formed of a first wall of fine mesh wire screen through which infra-red radiations generated in the casing are propagated and a second wall formed of fine mesh wire screen disposed at an angle to said first wall, said casing having therein the following: a fluid fuel burner, a hearth of refractory material disposed laterally of the burner and having a flame-impinging surface facing said first wall and adapted to generate and propagate through said first wall infra-red radiations when heated by the flame from said burner, and means disposed for blowing a current of air in spaced relation across the flame-impinging surface of said hearth toward and through said second wall to insure complete combustion of the fuel from the burner and to divert the products of combustion of the fuel away from said first wall.

2. An infra-red radiation generator according to claim 1 wherein said first wall of the casing through which the infra-red radiations are propagated is a double wall formed by spaced apart wire mesh screen.

3. An infra-red radiation generator according to claim 1 wherein the walls of wire mesh screen are formed of nickel-containing metal.

4. An infra-red radiation generator comprising a substantially parallelepipedon casing having a skeleton frame, the walls of the casing being formed of fine mesh wire screen, said casing having therein a manifold pipe gas burner extending parallel to one wall of the casing, a hearth of refractory material disposed laterally of the burner and adapted to have its top surface exposed to the flames from the burner and generate and propagate through the wall of the casing facing the top of the hearth infra-red radiations when heated by the flame from the burner, and means within the casing overlying the burner for blowing a current of air in spaced relation across the top of said hearth to insure complete combustion of the gas and divert the products of combustion of the gas so that they will not pass through the wall of the casing through which the infra-red radiations are propagated.

FRANCIS M. CROSSMAN.

References Cited in the file of this patent

UNITED STATES PATENTS

| Number | Name | Date |
|---|---|---|
| 1,127,323 | Tyree | Feb. 2, 1915 |
| 1,237,858 | Ballenger | Aug. 21, 1917 |
| 1,399,903 | Stevenson | Dec. 13, 1921 |
| 1,425,043 | O'Dowd | Aug. 8, 1922 |
| 2,159,149 | Hart | May 23, 1939 |
| 2,220,928 | Kienle et al. | Nov. 12, 1940 |
| 2,361,097 | Hess | Oct. 24, 1944 |
| 2,462,166 | Crossman | Feb. 22, 1949 |
| 2,547,735 | Blaha | Apr. 3, 1951 |

FOREIGN PATENTS

| Number | Country | Date |
|---|---|---|
| 265,041 | Great Britain | Feb. 3, 1927 |

OTHER REFERENCES

Page 44 of Trink's Industrial Furnaces, vol. II, second edition, copyright 1942, published by John Wiley and Sons, New York, N. Y. (A copy of this text is in Division 3.)